US011288635B2

(12) United States Patent
Allington et al.

(10) Patent No.: US 11,288,635 B2
(45) Date of Patent: Mar. 29, 2022

(54) ADJUSTING CALENDARS OF INTEREST ON A PER-USER BASIS

(71) Applicant: Microsoft Technology Licensing, LLC, Redmond, WA (US)

(72) Inventors: Clea Allington, Seattle, WA (US); Cindy Kwan, Bellevue, WA (US); Jaime Hwacinski, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1112 days.

(21) Appl. No.: 15/636,256

(22) Filed: Jun. 28, 2017

(65) Prior Publication Data

US 2019/0005459 A1 Jan. 3, 2019

(51) Int. Cl.
*G06Q 10/10* (2012.01)

(52) U.S. Cl.
CPC ................ *G06Q 10/1095* (2013.01)

(58) Field of Classification Search
None
See application file for complete search history.

(56) References Cited

U.S. PATENT DOCUMENTS

| | | | | | |
|---|---|---|---|---|---|
| 5,692,125 | A | * | 11/1997 | Schloss | G06Q 10/06 705/7.16 |
| 5,781,731 | A | * | 7/1998 | Koreeda | H04M 3/56 709/204 |
| 6,167,379 | A | * | 12/2000 | Dean | G06Q 10/109 705/7.18 |
| 7,512,454 | B1 | * | 3/2009 | Li | G06Q 50/04 700/97 |
| 7,693,736 | B1 | * | 4/2010 | Chu | G06Q 10/1095 705/7.19 |
| 7,827,050 | B2 | | 11/2010 | Bangel et al. | |
| 8,200,520 | B2 | * | 6/2012 | Chen | G06Q 10/06312 705/7.19 |

(Continued)

FOREIGN PATENT DOCUMENTS

| | | |
|---|---|---|
| EP | 0436459 A1 | 7/1991 |
| WO | 1999042974 A1 | 8/1999 |

OTHER PUBLICATIONS

L. Dusseaultand J. Whitehead, "Open calendar sharing and scheduling with CalDAV," in IEEE Internet Computing, vol. 9, No. 2, pp. 81-89, Mar.-Apr. 2005, doi: 10.1109/MIC.2005.43. (Year: 2005).*

(Continued)

*Primary Examiner* — Shelby A Turner (57) ABSTRACT

Systems, methods, and software technology for enhancing calendars of interest is disclosed herein. In an implementation, a calendar of interest is added to an online calendar. The calendar of interest comprises a schedule of events and a rule set for adjusting the schedule of events. As the events occur in the online calendar, a record of participation by a user with respect to the events is identified. After each event has occurred, a determination is made whether to make an adjustment to the schedule of events based at least on the rule set for the calendar of interest and the record of participation by the user after the event. If so, the schedule of events is updated in the online calendar to reflect any adjustments.

20 Claims, 9 Drawing Sheets

(56) References Cited

U.S. PATENT DOCUMENTS

| | | | | |
|---|---|---|---|---|
| 8,688,489 B2* | 4/2014 | Bhogal | G06Q 10/1095 | 705/7.11 |
| 8,775,207 B2* | 7/2014 | Abraham | G06Q 10/109 | 705/3 |
| 8,849,689 B1* | 9/2014 | Jagannathan | G06Q 10/1095 | 705/7.19 |
| 10,417,613 B1* | 9/2019 | Brisebois | G06Q 10/1095 | |
| 10,510,050 B2* | 12/2019 | Meushar | G06Q 10/1095 | |
| 2003/0014292 A1* | 1/2003 | Strubbe | G06Q 30/02 | 702/178 |
| 2003/0149606 A1* | 8/2003 | Cragun | G06Q 10/109 | 705/7.19 |
| 2003/0204474 A1* | 10/2003 | Capek | G06Q 20/382 | 705/64 |
| 2005/0165631 A1* | 7/2005 | Horvitz | G06Q 10/063116 | 705/7.16 |
| 2006/0020889 A1* | 1/2006 | Coppinger | G06Q 10/109 | 715/710 |
| 2006/0129445 A1* | 6/2006 | McCallum | G06Q 10/1093 | 705/7.18 |
| 2006/0173725 A1* | 8/2006 | Abraham | G06Q 10/109 | 705/3 |
| 2007/0226010 A1* | 9/2007 | Larsen | G16H 40/20 | 705/2 |
| 2007/0239509 A1* | 10/2007 | Kaminsky | G06Q 10/1095 | 705/7.18 |
| 2008/0040187 A1* | 2/2008 | Carraher | G06Q 10/109 | 705/7.19 |
| 2008/0050715 A1* | 2/2008 | Golczewski | G06Q 20/102 | 434/350 |
| 2008/0091504 A1* | 4/2008 | Lyle | G06Q 10/063116 | 705/7.19 |
| 2008/0167937 A1* | 7/2008 | Coughlin | G06Q 10/1095 | 705/7.16 |
| 2008/0195312 A1* | 8/2008 | Aaron | G06Q 30/0201 | 455/418 |
| 2009/0030609 A1* | 1/2009 | Orttung | G01C 21/00 | 701/469 |
| 2009/0055236 A1* | 2/2009 | O'Sullivan | G06Q 10/00 | 705/7.16 |
| 2009/0077183 A1* | 3/2009 | Bruce | G06Q 10/109 | 709/206 |
| 2009/0083105 A1* | 3/2009 | Bhogal | G06Q 10/1095 | 705/7.19 |
| 2009/0094088 A1* | 4/2009 | Chen | G06Q 10/06314 | 705/7.19 |
| 2009/0125365 A1* | 5/2009 | Masselle | G06Q 10/1093 | 705/7.18 |
| 2009/0259674 A1* | 10/2009 | Griffin | G06Q 10/109 | |
| 2009/0292550 A1* | 11/2009 | Ly | G06Q 10/109 | 705/300 |
| 2009/0319926 A1* | 12/2009 | Chakra | G06Q 10/109 | 715/764 |
| 2010/0070314 A1* | 3/2010 | Jethani | G06Q 10/109 | 705/6 |
| 2010/0088144 A1* | 4/2010 | Collet | G06Q 10/06311 | 705/7.13 |
| 2010/0235215 A1* | 9/2010 | Hardy | G06Q 10/1093 | 705/7.18 |
| 2010/0255451 A1 | 10/2010 | Shapiro | | |
| 2010/0262926 A1* | 10/2010 | Gupta | G06Q 10/109 | 715/764 |
| 2010/0332278 A1* | 12/2010 | Stern | G06Q 10/1093 | 705/7.18 |
| 2011/0178832 A1* | 7/2011 | Burchard | G06Q 10/00 | 705/7.12 |
| 2011/0184768 A1* | 7/2011 | Norton | G06Q 10/109 | 705/5 |
| 2011/0184943 A1* | 7/2011 | Norton | G06Q 10/02 | 707/723 |
| 2011/0288947 A1 | 11/2011 | Biran | | |
| 2012/0053963 A1* | 3/2012 | Seymour | G16H 15/00 | 705/3 |
| 2012/0054187 A1* | 3/2012 | Priyadarshan | G06F 16/9535 | 707/740 |
| 2012/0089909 A1 | 4/2012 | Block et al. | | |
| 2012/0166242 A1* | 6/2012 | Bentley | G06Q 10/06311 | 705/7.13 |
| 2012/0191500 A1* | 7/2012 | Byrnes | G06Q 10/1095 | 705/7.19 |
| 2012/0233563 A1* | 9/2012 | Chakra | G06Q 10/1093 | 715/772 |
| 2013/0035209 A1 | 2/2013 | Gilley et al. | | |
| 2013/0117058 A1* | 5/2013 | Norton | G06Q 10/06311 | 705/7.16 |
| 2013/0151302 A1* | 6/2013 | Kho | G06Q 10/109 | 705/7.19 |
| 2013/0282421 A1* | 10/2013 | Graff | H04L 63/08 | 705/7.18 |
| 2013/0290055 A1* | 10/2013 | Konchitsky | G06Q 10/1093 | 705/7.16 |
| 2013/0290438 A1* | 10/2013 | Bank | G06F 3/0481 | 709/206 |
| 2013/0317874 A1* | 11/2013 | Kozloski | G06Q 10/109 | 705/7.19 |
| 2014/0032288 A1 | 1/2014 | Rosenberg | | |
| 2014/0244743 A1* | 8/2014 | Beerse | G06Q 10/10 | 709/204 |
| 2015/0046208 A1* | 2/2015 | Hatamleh | G06Q 10/1095 | 705/7.19 |
| 2015/0112748 A1* | 4/2015 | Kaye | G06Q 10/1093 | 705/7.19 |
| 2015/0262132 A1* | 9/2015 | Miller | G06Q 10/109 | 705/7.15 |
| 2015/0310752 A1* | 10/2015 | Barrett | G06Q 10/063114 | 434/219 |
| 2015/0356516 A1* | 12/2015 | Kagan | G06Q 10/1095 | 705/7.19 |
| 2016/0029085 A1* | 1/2016 | Mountain | H04N 21/4583 | 725/43 |
| 2016/0103921 A1 | 4/2016 | Brust et al. | | |
| 2016/0142882 A1* | 5/2016 | Coughlin | H04W 68/00 | 455/456.1 |
| 2016/0180296 A1* | 6/2016 | McDonald | G06F 3/04842 | 705/7.19 |
| 2016/0232495 A1* | 8/2016 | Au | G06Q 10/1095 | |
| 2016/0350720 A1* | 12/2016 | Moorjani | G06Q 10/1095 | |
| 2016/0350721 A1* | 12/2016 | Comerford | G06Q 10/1095 | |
| 2016/0350722 A1* | 12/2016 | Walker | G16H 40/20 | |
| 2017/0024704 A1* | 1/2017 | Tompkins | G06Q 10/1095 | |
| 2017/0163503 A1* | 6/2017 | Black | G09B 7/00 | |
| 2018/0039931 A1* | 2/2018 | Dotson | H04L 67/10 | |
| 2018/0069937 A1* | 3/2018 | Kolleri | G06Q 10/1093 | |
| 2018/0107988 A1* | 4/2018 | Codella | G06Q 10/1095 | |
| 2018/0137472 A1* | 5/2018 | Gorzela | G06Q 10/1095 | |
| 2018/0165656 A1* | 6/2018 | Tessler | G06Q 10/1095 | |
| 2018/0189743 A1* | 7/2018 | Balasubramanian | G06N 5/025 | |
| 2018/0225680 A1* | 8/2018 | Wilson | G06Q 30/0203 | |
| 2018/0322471 A1* | 11/2018 | Anderson | G06Q 10/107 | |
| 2018/0365653 A1* | 12/2018 | Cleaver | G06Q 10/1095 | |
| 2019/0130174 A1* | 5/2019 | Chen | G06Q 10/1091 | |
| 2020/0258054 A1* | 8/2020 | Kaufman | G06Q 10/1095 | |

OTHER PUBLICATIONS

A. Grosso, C. Vecchiola, M. Coccoli and A. Boccalatte, "A multiuser groupware calendar system based on agent tools and technology," Proceedings of the 2005 International Symposium on Collaborative Technologies and Systems, 2005., 2005, pp. 144-151, doi: 10.1109/ISCST.2005.1553306. (Year: 2005).*

* cited by examiner

ADJUSTING CALENDARS OF INTEREST ON A PER-USER BASIS

TECHNICAL BACKGROUND

A wide variety of interesting calendars are presently available for end-users to add to their online calendars. The schedule for a favorite sports franchise may be added to one's calendar, for example. The calendar of interest may even be updated dynamically with additional information on a scheduled event, such as the final score of a game.

The dynamic nature of some calendars of interest is essentially a unidirectional capability. That is, the calendar may be updated to reflect the current state of an event, but the update comes from the source of the interesting calendar itself. The participation of a given user with respect to the events in a calendar of interest has no bearing on how or why the events are scheduled.

For instance, a user may subscribe to a calendar of interest to follow the accomplishments of the aforementioned sports franchise. Whether that user actually attends a game has no effect on the remainder of the schedule. In a broader sense, calendars of interest are generally one-way experiences that lack individual customization. As such, they are inherently limited in their utility and heretofore have been relatively obscure features of various calendar services.

OVERVIEW

Technology is disclosed herein that improves the user experience with respect to calendars of interest and calendar services. In an implementation, a calendar of interest is added to an online calendar. The calendar of interest comprises a schedule of events and a rule set for adjusting the schedule of events. As the events occur in the online calendar, a record of participation by a user with respect to the events is identified. After each event has occurred, a determination is made whether to make an adjustment to the schedule of events based at least on the rule set for the calendar of interest and the record of participation by the user after the event. If so, the schedule of events is updated in the online calendar to reflect any adjustments.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Technology is disclosed herein for that allows calendars of interest to be adjusted on a per-user basis. A user may subscribe to, download, or otherwise add a calendar of interest to his or her online calendar. The calendar of interest includes a schedule of events and a rule set for adjusting the schedule of events. As the schedule of events progresses, a record of participation by the user in the events may be identified and used to adjust the remainder of the schedule. In some implementations, the rule set is applied to at least a portion of the record of participation to determine what adjustment(s)—if any—to make to the schedule of events. In this manner, a calendar of interest that initially may be available to any users becomes customized for each specific user.

Adjusting the schedule of events may involve, for example, rescheduling an event that was missed (and potentially rescheduling one or more subsequent events), repeating events, or adding new events to the schedule. In some implementations, signaling from the end users (e.g. user input) indicative of their participation may be considered when adjusting the calendar. Signaling received from other users may also factor into an adjustment to a schedule of events. That is, some adjustments may be made based on the overall participation of many users with respect to one or more schedules of events, not just the participation of one user associated with a given instance of a calendar of interest.

In some implementations, the calendar of interest may be adjusted by the calendar service that hosts end-users' online calendars. The calendar service may receive user input via the calendar applications on end-user devices and may adjust the schedules of events in a given calendar of interest accordingly. In other implementations, a third-party service may determine how to adjust a calendar of interest. The third-party service may receive the user input instead, allowing it to make the adjustments. In still other implementations, the local calendar application itself may be capable of analyzing user participation and making the necessary adjustments.

One application of the technology disclosed herein may be a goal planning system. The goal planning system may allow calendars of interest related to specific goals to be produced, employed, and customized on a per-user basis. As an example, one calendar of interest may relate to a training regime with specific exercise steps laid out in the schedule of events. The steps can be added to a user's calendar and adjusted based on user participation with respect to the steps. In another example, the calendar of interest may relate to learning a new language, certification, or other such skill. The schedule of events may then pertain to specific steps in a regime for obtaining the skill.

Figure 1:
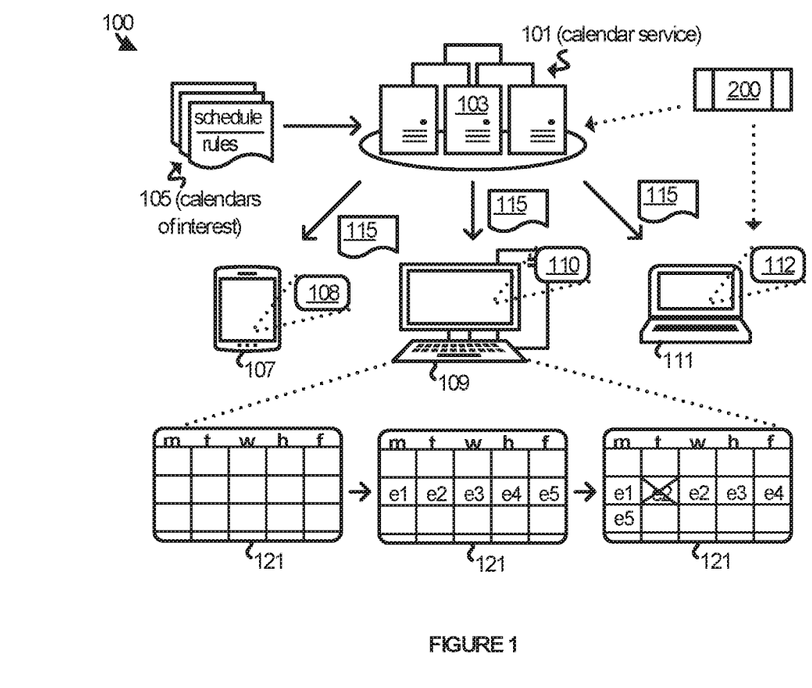
FIG. 1 illustrates an operational environment in an implementation of enhanced calendars of interest.

FIG. 1 illustrates an operational environment 100 in an implementation of calendars of interest that may be adjusted on a per-user basis. Operational environment 100 includes a calendars service 101 that may host online calendars for end-users. The end-users may access the online calendars via their local computing devices, of which device 107, device 109, and device 111 are representative.

Figure 9:
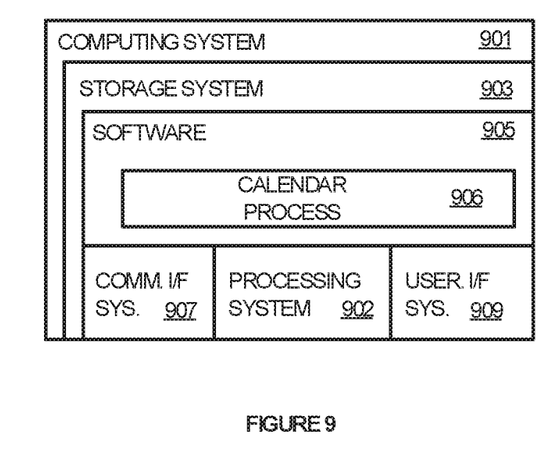
FIG. 9 illustrates a computing system suitable for implementing the calendar technology disclosed herein, including any of the environments, processes, and operational scenarios illustrated in the Figures and discussed below in the Technical Disclosure.

Calendar service 101 is representative of one or more software applications capable of hosting an online calendar that may be accessed by end-users via calendar applications on their devices. Calendar service 101 may be a stand-alone service or may be integrated with one or more other services in the context of a personal information management (PIM) service. Calendar service 101 may be implemented on one or more physical or virtual servers in the context of a data center 103. Computing system 901 in FIG. 9 is broadly representative of such servers.

Device 107, device 109, and device 111 are each representative of any computing device capable of running a calendar application for interfacing with calendar service 101, of which calendar application 108, calendar application 110, and calendar application 112 are representative. Examples include, but are not limited to, mobile phones, tablet computers, laptop computers, desktop computers, wearable devices, virtual reality devices, gaming devices, and any variation or combination thereof. Computing system 901 in FIG. 9 is also broadly representative of such devices.

Calendar application 108, calendar application 110, and calendar application 112 are each be representative of a client application or applications capable of interfacing with calendar service 101 to provide end users with access to online calendars. Calendar applications 108, 110 and 112 may be implemented as stand-alone applications or they may be integrated in the context of larger applications, e.g. a personal information management application. Calendar applications 108, 110, and 112 may be natively installed and executed applications, web applications that execute in the context of a web browser, mobile applications, desktop applications, streamed or streaming applications, or any variation or combination thereof.

Figure 2:
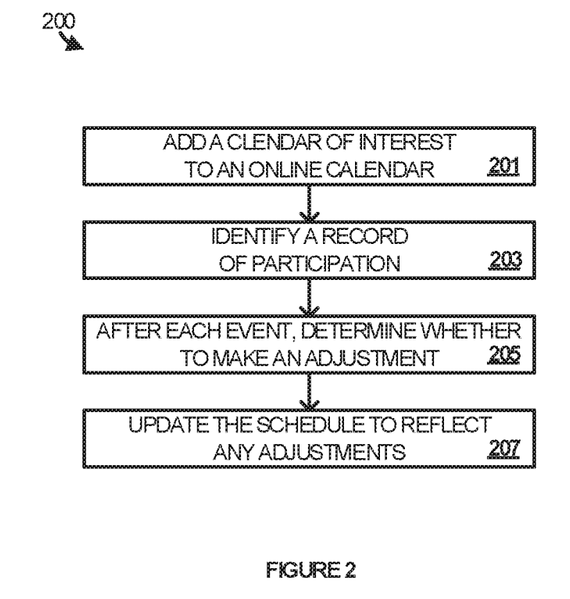
FIG. 2 illustrates a calendar process in an implementation.

FIG. 2 illustrates a calendar process 200 (also shown in FIG. 1) that may be implemented by any one or more of calendar service 101 or calendar applications 108, 110, and 112, to enhance the user experience with respect to online calendars. Calendar process 200 may be implemented in program instructions in the context of any of the software applications, modules, components, or other such programming elements that comprise calendar service 101 and/or calendar applications 108, 110, and 112. The program instructions direct the underlying physical or virtual computing system or systems that provide a calendar to operate as follows.

To begin, the service or application adds a calendar of interest to an online calendar associated with a user (step 201). This may occur in response to, for example, the user selecting the calendar of interest from a set of possible calendars. In other cases, the user may be sent a calendar of interest from another user or from a third-party. It may also be possible for the user to create the calendar of interest or to obtain it in some other manner.

The calendar of interest may include a schedule of events and a rule set for adjusting the calendar of interest. The rule set expresses which adjustments to make in response to various patterns of participation that may be exhibited by a user with respect to a schedule. The rule set may be in the form of a table having the patterns listed in a corresponding fashion with respect to the adjustment. In other implementations, the rule set may be expressed in a script or set of scripts that may be executed against a given pattern. Other forms are possible and may be considered within the scope of the present disclosure.

Adding the calendar of interest to an online calendar may include adding the specific events to the user's calendar such that they are integrated alongside any other events that the user may have scheduled. The events in the calendar of interest may be defined in terms of a given event and potentially a suggested time and duration for the event, although it may be appreciated that both the time and duration are optional. Once the schedule of events is added to the user's calendar, it may be synched such the user can view the schedule of events from any of his or her devices.

As the schedule of events progresses and the individual events occur, a record of participation for the user is identified with respect to the events (step 203). The record of participation may be identified from user input in some implementations. The user may supply user input indicative of whether or not the user participated in a given event, and possibly to what extent. In a simple example, a given event may be represented in a control in a user interface to an application. The control may include various sub-controls representative of possible states for the event, such as completed or incomplete. The user may select one or the other, depending upon whether the user participated in the event or not. In some scenarios, yet other sub-controls may be present that allow the user to specific any intermediate level of participations, such as having complete a fraction of an event (or less than full participation, but more than no participation).

Next, a determination is made after every event whether to adjust the remainder of the schedule of events based on the record of participation and on the adjustment rules for the schedule (step 205). In some scenarios, a recent pattern of participation may be derived from the record of participation. The recent pattern may be compared to a set of patterns in the rules to determine if it corresponds to any given one. If so, the corresponding adjustment for that pattern may be applied to the schedule of events. For example, if the user fails to participate in a single event, the schedule may be adjusted to redo that event. If the user fails to participate in two or more consecutive (or adjacent) events, then the schedule may be adjusted such that the user must redo a prior event earlier than the missed events. In still other scenarios, a supplemental event may be added to the schedule.

Once the adjustments have been determined, the schedule of events is updated to reflect the adjustments (step 207). In some implementations, only the specific events that are modified, added, or removed from the schedule may be updated. In other implementations, the entire calendar of interest may be updated. For example, the previous version of the online calendar may be removed from the end-user's calendar. Then the new version that reflects the adjustments may be added to the end-user's calendar. In effect, a personalized calendar of interest may be created and added to the user's calendar.

Figure 3:
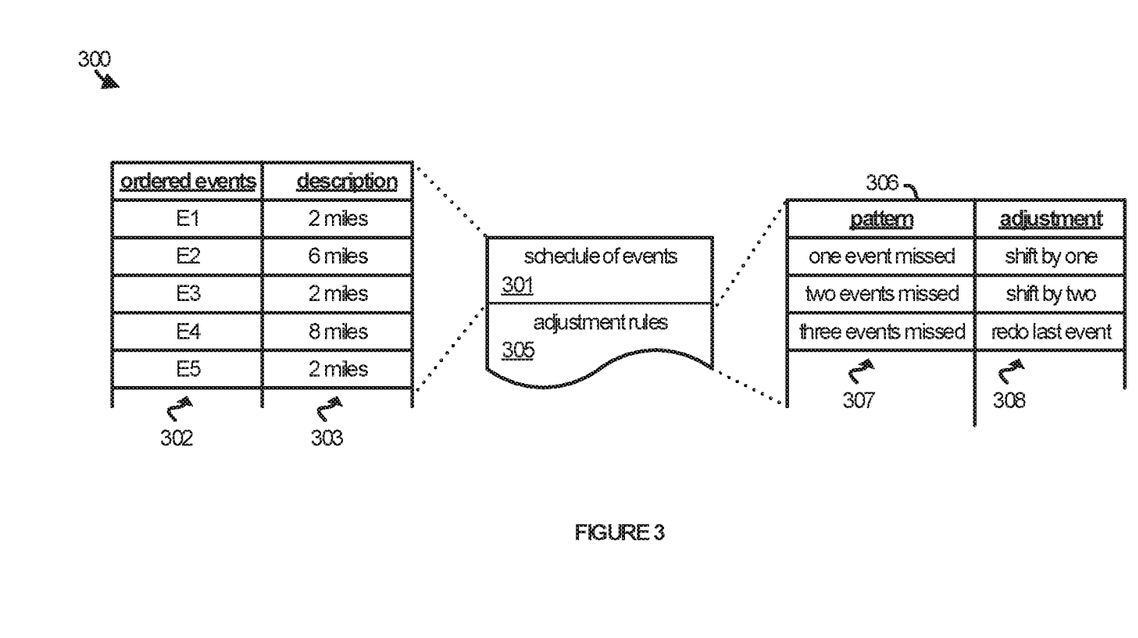
FIG. 3 illustrates a calendar of interest in an implementation.

FIG. 3 illustrates a calendar of interest 300 in an implementation. Calendar of interest 300 includes a schedule of events 301 and adjustment rules 305. Calendar of interest 300 in this example is a training schedule for an exercise enthusiast. Accordingly, the schedule of events 301 includes a list of ordered events 302, beginning with e1 and progressing through e5. A user interested in this calendar would thus be scheduled to run two miles one day, followed by six miles, and so on per the schedule.

The adjustment rules 306 include a list 307 of patterns and a list 308 of corresponding adjustments to make to the schedule of events should the end-user fail to complete a given even or events. If one event is missed, then the schedule is shifted by one to accommodate the missed event. Similarly, if two adjacent events are missed, the schedule can be shifted by two. However, if three events are missed, then the most recent event accomplished prior to the series of missed events is repeated. Of course, a variety of patterns and adjustments may be specified by the creator of the calendar of interests.

A brief operational scenario is illustrated in FIG. 1 to further explain various aspects of enhanced calendars of interest with respect to the calendar of interest 300 in FIG. 3. In operation, calendars of interest 105 are made available on calendar service 101. Each calendar of interest includes its own schedule of events and a rule set for adjusting the schedule of events. End-users may add any one or more of the calendars of interest to their online calendars.

Once a calendar of interest is added to an online calendar, the schedule of events may be viewed by a user on any of the user's devices and applications that access his or her online calendar. For example, a schedule of events 115 for a given calendar of interest may be published to and viewed on all three of devices 107, 109, and 111 via calendar applications 108, 110, and 112 respectively.

Using device 109 and application 110 to illustrate the point, a view 121 to a user's calendar initially has no events scheduled in it. It is assumed for exemplary purposes that the user selects a new calendar of interest. The schedule of events for the calendar of interest is then added to the user's calendar, resulting in a set of events being scheduled, as illustrated by events e1, e2, e3, e4, and e5.

The events follow a given sequence are may be adjusted based on specific rules for the calendar of interest. As the schedule of events progresses, a record of participation by the user with respect to the events may be ascertained. As mentioned, participation may be determined form user input, but it may be determined in other ways as well. For instance, information may be obtained from a wearable device (e.g. a fitness device) to determine if the user completed a specific event. In another example, information may be obtained from another computing device or information technology appliance to determine if a user completed a given event (e.g. completed a reading assignment).

Here, it is assumed for exemplary purposes that the user successfully completed event e1, but then failed to complete event e2 in its entirety. As such, the schedule of events has been adjusted by shifting the events one day into the future and adding event e2 back to the schedule. Whereas event e2 was initially scheduled to be completed on the second day of the week, is has been shifted to the third. The remainder of the schedule of events has also been shifted by one day.

Figure 4A:
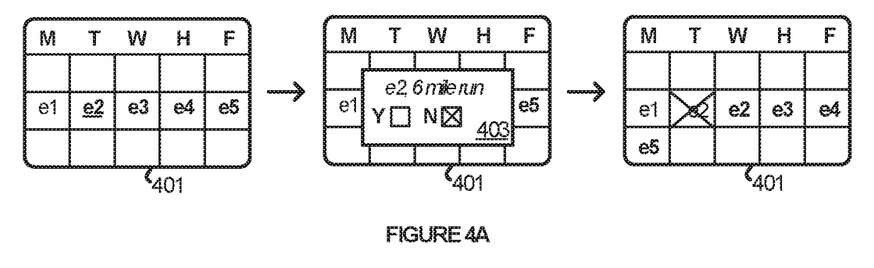
FIGS. 4A-4C illustrate various operational scenarios in an implementation of enhanced calendars of interest.
Figure 4B:
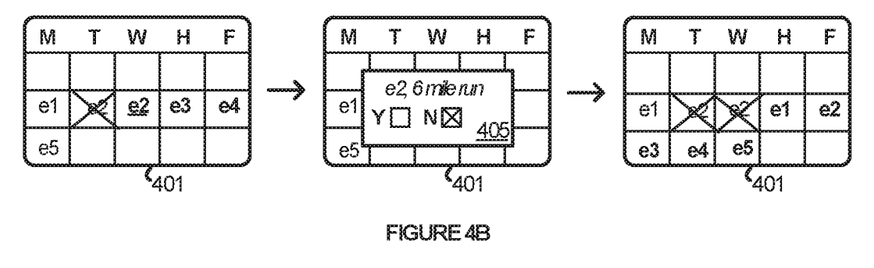
Figure 4C:
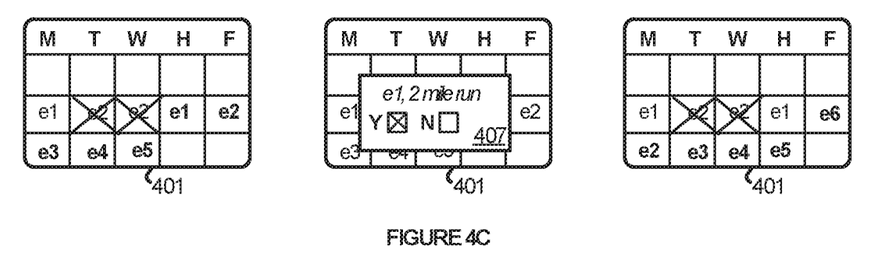

FIGS. 4A-4C illustrate several more operational scenarios that illustrate aspects of the disclosure. It may be assumed for exemplary purposes that the rules associated with the calendar of interest in FIGS. 4A-4C specify that one missed event causes the schedule to be shifted by one day, but two missed events causes the shift and mandates that the most-recently completed event be repeated. In addition, the schedule of events in FIGS. 4A-4C may be changed dynamically based on machine learning or other adaptive techniques.

In FIG. 4A, the scenario illustrated in FIG. 1 is repeated, whereby the events of a calendar of interest are scheduled and displayed in a calendar 401. Next, the schedule of events has progressed to event e2 and a control 403 is surfaced to the user. The control 403 includes two sub-controls (check boxes) for indicating whether event e2 was completed. Event e2 in this case is a six-mile run and the user indicates that the event was not completed. Accordingly, the schedule of events is shifted one day into the future.

In FIG. 4B, a visual indication is provided with respect to the original scheduling of event e2. The schedule progresses again to event e2 in its newly scheduled timeframe and control 405 is surfaced responsively. The end-user indicates again that the event was not completed. As such, the schedule is not only shifted into the future, but event e1—which the user had previously completed—is added back to the schedule. Accordingly, the user must first repeat event e1 before moving on to event e2.

In FIG. 4C, the user finally completes event e1. However, in the meantime the calendar of interest has been adapted to reflect insights learned from the user's own behavior, but also the behavior and feedback received from other users. Rather than progressing from event e1 to e2, a new event (e6) has been inserted into the schedule of events. The use must now complete event e6 before progressing to event e2. Event e6 is inserted automatically into the schedule of events while the remainder of the schedule of events is shifted one day into the future to accommodate e6.

Figure 5:
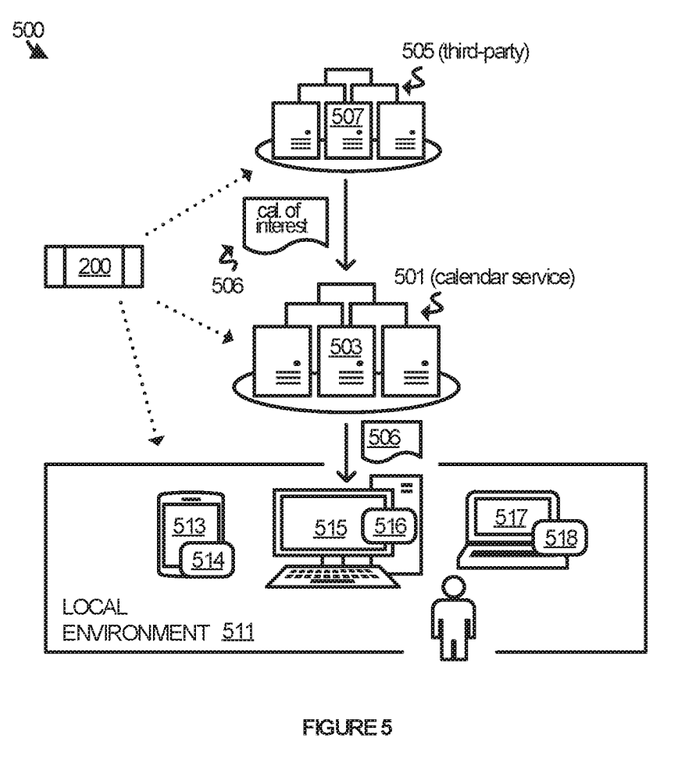
FIG. 5 illustrates an operational environment in an implementation of enhanced calendars of interest.

FIG. 5 illustrates an operational environment 500 in an implementation of calendars of interest that may be adjusted on a per-user basis. Operational environment 500 includes a calendars service 501 that may host online calendars for end-users, as well as a third-party service 505 that may host and/or provide calendars of interest for the end-users. The end-users may access the online calendars and calendars of interest via their local computing devices, of which device 513, device 515, and device 517 are representative.

Calendar service 501 is representative of one or more software applications capable of hosting an online calendar that may be accessed by end-users via calendar applications on their devices. Calendar service 501 may be a stand-alone service or may be integrated with one or more other services in the context of a personal information management (PIM) service. Calendar service 501 may be implemented on one or more physical or virtual servers in the context of a data center 503. Computing system 901 in FIG. 9 is broadly representative of such servers.

Third-party service 505 is representative of one or more software applications capable of hosting calendars of interest. Third-party service 505 may also be a stand-alone service or may be integrated with one or more other services. Third-party service 505 may be implemented on one or more physical or virtual servers in the context of a data center 507, of which computing system 901 in FIG. 9 is broadly representative.

Device 513, device 515, and device 517 are each representative of any computing device capable of running a calendar application for interfacing with calendar service 501, of which calendar application 514, calendar application 516, and calendar application 518 are representative. Examples include, but are not limited to, mobile phones, tablet computers, laptop computers, desktop computers, wearable devices, virtual reality devices, gaming devices, and any variation or combination thereof. Computing system 901 in FIG. 9 is also broadly representative of such devices.

Calendar process 200, described with respect to FIG. 2, may also be implemented by any one or more of calendar service 501, third-party service 505, and calendar applications 514, 516, and 518 to enhance the user experience with respect to online calendars. Calendar process 200 may be implemented in program instructions in the context of any of the software applications, modules, components, or other such programming elements that comprise calendar service 501, third-party service 505, and calendar applications 514, 516, and 518. The program instructions direct the underlying physical or virtual computing system or systems that provide an online calendar to operate as follows as described with respect to the operational scenarios in FIGS. 6-8.

Figure 6:
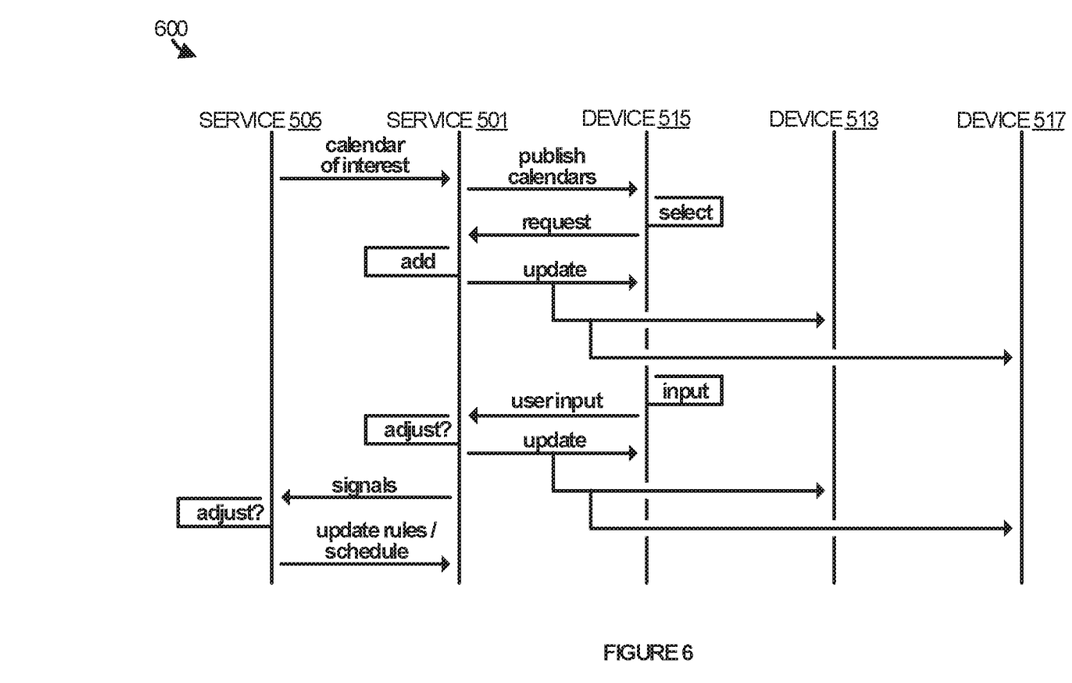
FIG. 6 illustrates an operational scenario in an implementation.

In FIG. 6, calendar process 200 is implemented calendar service 501. In operation, third-party service 505 uploads a calendar of interest to calendar service 501. Calendar service 501 may publish the calendar of interest in a catalog or list of calendars of interest, from which its end-users may a select a given one or more to be added to their calendars. In this scenario, a user operating calendar application 516 on device 515 selects calendar of interest 506, causing calendar service 501 to add it to the user's online calendar. Calendar of interest 506 includes a schedule of events and rule set for adjusting the schedule.

Once added, calendar service 501 communicates an update to one or more of the other application and device pairs associated with the user, so that the local instances of the user's calendar can be updated with schedule of events for the selected calendar of interest. For example, device 513 and calendar application 514 receive the update, as do device 517 and calendar application 518.

As the schedule of events progresses (i.e. as time progresses), the user provides user input indicative of whether the user participated in a given event. The user input is communicated to calendar service 501 and, over time, a record of participation is developed, within which various patterns may emerge. Calendar service 501 periodically examines a recent pattern of participation for the user and determines if an adjustment is needed to the schedule of events in the calendar. The determination is made based on a set of rules associated with the calendar of interest, as developed by the third-party service 505.

Assuming an adjustment should be made to the schedule of events, calendar service 501 updates all of the local instances of the user's calendar. An update is sent to device 515, device 517, and device 519. In this manner, the end-user may experience the updated schedule of events on whichever device he or she users.

In the background, calendar service 501 may optionally provide signals to third-party service 505 that may be indicative of the user's participation with respect to the schedule of events. The signals may also be indicative of other users' participation with respect to the schedule of events (or their modified schedules). Third-party service 505 may process the signals using machine learning algorithms or other adaptive techniques to determine if any changes should be made to the calendar or interest. For example, third-party service 505 may resolve that one or more other events be added to the schedule, that one or more other events be removed from the schedule, and so on. Third-party service 505 may communicate the updates to calendar service 501, which in turn may update its users' calendars with the revised schedule of events.

Figure 7:
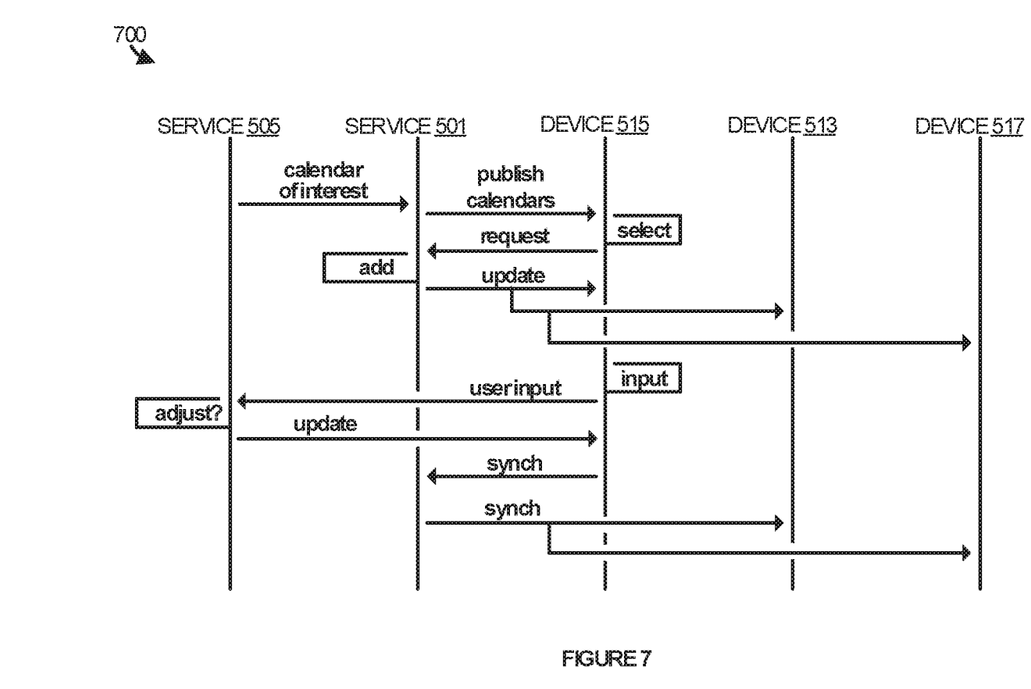
FIG. 7 illustrates an operational scenario in an implementation.

In FIG. 7, calendar process 200 is implemented by third-party service 505. In operation, third-party service 505 uploads a calendar of interest to calendar service 501. Calendar service 501 may publish the calendar of interest in a catalog or list of calendars of interest, from which its end-users may a select a given one or more to be added to their calendars. In this scenario, a user operating calendar application 516 on device 515 selects calendar of interest 506, causing calendar service 501 to add it to the user's online calendar. Calendar of interest 506 includes a schedule of events and rule set for adjusting the schedule.

Once added, calendar service 501 communicates an update to one or more of the other application and device pairs associated with the user, so that the local instances of the user's calendar can be updated with schedule of events for the selected calendar of interest. For example, device 513 and calendar application 514 receive the update, as do device 517 and calendar application 518.

As the schedule of events progresses (i.e. as time progresses), the user provides user input indicative of whether the user participated in a given event. The user input is communicated to third-party service 505 such that a record of participation may be developed. While shown as communicating directly with third-party service 505, it may be appreciated that device 515 (and calendar application 516) may communicate indirectly with third-party service 505 in some other implementations, such as via calendar service 501.

Third-party service 505 periodically examines a recent pattern of participation for the user and determines if an adjustment is needed to the schedule of events in the calendar. This may occur after every scheduled event, for example. The determination is made based on a set of rules associated with the calendar of interest, as developed by the third-party service 505.

Assuming an adjustment should be made to the schedule of events, third-party service 505 updates calendar application 516 on device 515 with the adjusted schedule of events. Calendar application 516 responsively updates calendar service 501 with the same, allowing calendar service 501 to communicate updates to the remaining local instances of the user's calendar.

While not shown, third-party service 505 may still make long-term adjustments to the schedule of interest based on the user input received from calendar application 516, but also from the user input received in association with other users. Such user input may be considered signaling and the signaling may be indicative of other users' participation with respect to their schedules of events. Third-party service 505 may process the signals using machine learning algorithms or other adaptive techniques to determine if any changes should be made to the calendar or interest. For example, third-party service 505 may resolve that one or more other events be added to the schedule, that one or more other events be removed from the schedule, and so on. Third-party service 505 may communicate the updates to a given instance of a calendar application, to calendar service 501, or in some other manner.

Figure 8:
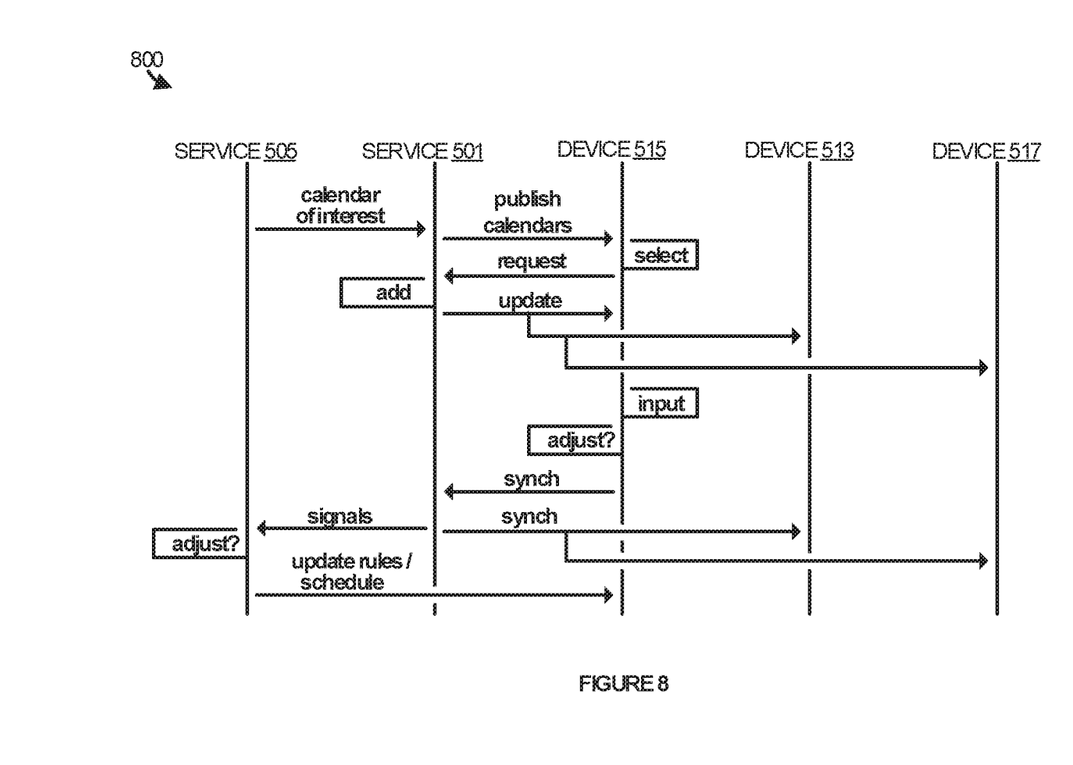
FIG. 8 illustrates an operational scenario in an implementation.

In FIG. 8, calendar process 200 is implemented by calendar application 516 on device 515. In operation, third-party service 505 uploads a calendar of interest to calendar service 501. Calendar service 501 may publish the calendar of interest in a catalog or list of calendars of interest, from which its end-users may a select a given one or more to be added to their calendars. In this scenario, a user operating calendar application 516 on device 515 selects calendar of interest 506, causing calendar service 501 to add it to the user's online calendar. Calendar of interest 506 includes a schedule of events and rule set for adjusting the schedule.

Once added, calendar service 501 communicates an update to one or more of the other application and device pairs associated with the user, so that the local instances of the user's calendar can be updated with schedule of events for the selected calendar of interest. For example, device 513 and calendar application 514 receive the update, as do device 517 and calendar application 518.

As the schedule of events progresses, the user provides user input indicative of whether the user participated in a given event. A record of participation may be developed based on the user input, from which a determination may be made about adjusting the schedule of events. Calendar application 516 periodically examines a recent pattern of participation for the user and determines if an adjustment is needed to the schedule of events in the calendar. This may occur after every scheduled event, for example. The determination is made based on a set of rules associated with the calendar of interest, as developed by the third-party service 505.

Assuming that an adjustment should be made to the schedule of events, calendar application 516 updates the local instance of the calendar of interest and also synchronizes the calendar with calendar service 501. Calendar service may then update calendar application 514 on device 513 and calendar application 518 on device 517.

Third-party service 505 may receive signaling from calendar service 501 indicate of the user input received from calendar application 516 and from the user input received in association with other users. Third-party service 505 may process the signals using machine learning algorithms or other adaptive techniques to determine if any changes should be made to the calendar or interest. Third-party service 505 may then communicate the updates to calendar service 501.

FIG. 9 illustrates computing system 901, which is representative of any system or collection of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909 (optional).

Processing system 902 loads and executes software 905 from storage system 903. Software 905 includes calendar process 906, which is representative of the processes discussed with respect to the preceding FIGS. 1-8, including calendar process 200. When executed by processing system 902 to enhance calendars of interest, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. For example, software 905 may include program instructions for implementing calendar process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include calendar process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system enhance calendars of interest. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here.

User interface system 909 may also include associated user interface software executable by processing system 902 in support of the various user input and output devices discussed above. Separately or in conjunction with each other and other hardware and software elements, the user interface software and user interface devices may support a graphical user interface, a natural user interface, or any other type of user interface.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computer-implemented method for dynamically customizing calendars of interest on a per-user basis, the method comprising:

on a computing device, a calendar application:
  causing display of a local instance of a user calendar hosted by a calendar service remote from the computing device;
  the calendar application accessing and selecting a calendar of interest published by the calendar service, wherein the calendar service received the calendar of interest from a third party service, and wherein the calendar of interest comprises a schedule of events and a rule set for adjusting the schedule of the events;
  responsive to selecting the calendar of interest, the calendar application receiving an update to the user calendar, wherein the update includes the schedule of events and an executable script provided to the calendar application for applying the rule set to determine adjustments to make to the schedule of the events in correspondence with patterns of participation, and adding the schedule of events to the local instance of the user calendar;
  after an event of the events occurs in the user calendar, the calendar application executing the script to identify a record of participation by a user with respect to the events and a recent pattern of participation and, after identifying the recent pattern of participation, to identify an adjustment to make to the schedule of the events based at least on the recent pattern of participation, wherein identifying the recent pattern of participation comprises receiving selection of a checkbox displayed in a graphical user interface of the calendar application indicating whether a given one of the schedule of events was completed;

in response to identifying the adjustment, the calendar application updating the schedule of the events in the local instance of the user calendar, to reflect the adjustment; and after updating the local instance of the user calendar, the calendar application syncing the local instance of the user calendar with an instance of the user calendar hosted by the calendar service, wherein the calendar service updates at least one other local instance of the user calendar on at least one other computing device to reflect the adjustment;

wherein the adjustments comprise shifting the schedule of events without repeating any of the events, and shifting the schedule of events while repeating at least one of the events; and wherein the patterns of participation comprise a single instance of incomplete participation adjacent to no other instances of incomplete participation, and multiple instances of incomplete participation adjacent to each other.

2. The computer-implemented method of claim 1 wherein applying the rule set to identify the adjustment to make to the schedule of the events based at least on the recent pattern of participation comprises determining which one of the adjustments corresponds to the recent pattern of participation.

3. The computer-implemented method of claim 2 wherein the rule set specifies shifting the schedule of the events without repeating any of the events when the recent pattern of participation comprises a single instance of incomplete participation adjacent to no other instances of incomplete participation.

4. The computer-implemented method of claim 3 wherein the rule set further specifies shifting the schedule of the events and repeating at least one of the events when the recent pattern of participation comprises multiple instances of incomplete participation adjacent to each other.

5. The computer-implemented method of claim 4 further comprising, on the computing device, displaying the schedule of events in the graphical user interface to the calendar application, wherein the selection of the checkbox is received through the graphical user interface.

6. The computer-implemented method of claim 5 wherein the graphical user interface comprises a control for receiving the user input, wherein the control comprises the checkbox.

7. The computer-implemented method of claim 6 wherein the checkbox includes two sub-controls for indicating of whether the given one of the schedule of events was completed or not completed.

8. A computing device comprising:
one or more computer readable storage media;
a processing system operatively coupled with the one or more computer readable storage media; and
a calendar application comprising program instructions stored on the one or more computer readable media that, when read and executed by the processing system, direct the computing device to at least:

cause display of a local instance of a user calendar hosted by a calendar service remote from the computing device;

access and select a calendar of interest published by the calendar service, wherein the calendar service received the calendar of interest from a third party service, and wherein the calendar of interest comprises a schedule of events and a rule set for adjusting the schedule of the events;

responsive to selecting the calendar of interest, receive an update to the user calendar, wherein the update includes the schedule of events and an executable script provided to the calendar application for applying the rule set to determine adjustments to make to the schedule of the events in correspondence with patterns of participation, and add the schedule of events to the local instance of the user calendar;

after an event of the events occurs in the user calendar, execute the script to identify a record of participation by a user with respect to the events and a recent pattern of participation and, after identifying the recent pattern of participation, to identify an adjustment to make to the schedule of the events based at least on the recent pattern of participation, wherein identifying the recent pattern of participation comprises receiving selection of a checkbox displayed in a graphical user interface of the calendar application indicating whether a given one of the schedule of events was completed;

in response to identifying the adjustment, update the schedule of the events, in the local instance of the user calendar, to reflect the adjustment; and after updating the local instance of the user calendar, syncing the local instance of the user calendar with an instance of the user calendar hosted by the calendar service, wherein the calendar service updates at least one other local instance of the user calendar on at least one other computing device to reflect the adjustment;

wherein the adjustments comprise shifting the schedule of events without repeating any of the events, and shifting the schedule of events while repeating at least one of the events; and wherein the patterns of participation comprise a single instance of incomplete participation adjacent to no other instances of incomplete participation, and multiple instances of incomplete participation adjacent to each other.

9. The computing device of claim 8 wherein to identify the adjustment, the program instructions direct the processing system to determine which one of the adjustments corresponds to the recent pattern of participation by the user.

10. The computing device of claim 9 wherein the rule set specifies shifting the schedule of the events without repeating any of the events when the recent pattern of participation comprises a single instance of incomplete participation adjacent to no other instances of incomplete participation.

11. The computing device of claim 10 wherein the rule set specifies shifting the schedule of the events and repeating at least one of the events when the recent pattern of participation comprises multiple instances of incomplete participation adjacent to each other.

12. One or more non-transitory computer readable storage media having a calendar application stored thereon comprising program instructions that, when executed by one or more processors of a computing device, direct the computing device to at least:

cause display of a local instance of a user calendar hosted by a calendar service remote from the computing device;

access and select a calendar of interest published by the calendar service, wherein the calendar service received the calendar of interest from a third party service, and wherein the calendar of interest comprises a schedule of events and a rule set for adjusting the schedule of the events;

responsive to selecting the calendar of interest, receive an update to the user calendar, wherein the update includes the schedule of events and an executable script provided to the calendar application for applying the rule set to determine adjustments to make to the schedule of the events in correspondence with patterns of participation, and add the schedule of events to the local instance of the user calendar;

after an event of the events occurs in the user calendar, execute the script to identify a record of participation by a user with respect to the events and a recent pattern of participation and, after identifying the recent pattern of participation, to identify an adjustment to make to the schedule of the events based at least on the recent pattern of participation, wherein identifying the recent pattern of participation comprises receiving selection of a checkbox displayed in a graphical user interface of the calendar application indicating whether a given one of the schedule of events was completed;

in response to identifying the adjustment, update the schedule of the events, in the local instance of the user calendar, to reflect the adjustment; and after updating the local instance of the user calendar, synchronize the local instance of the user calendar with an instance of the user calendar hosted by the calendar service, wherein the calendar service updates at least one other local instance of the user calendar on at least one other computing device to reflect the adjustment;

wherein the adjustments comprise shifting the schedule of events without repeating any of the events, and shifting the schedule of events while repeating at least one of the events; and wherein the patterns of participation comprise a single instance of incomplete participation adjacent to no other instances of incomplete participation, and multiple instances of incomplete participation adjacent to each other.

13. The non-transitory computer readable storage media of claim 12 wherein applying the rule set to identify the adjustment to make to the schedule of the events based at least on the recent pattern of participation comprises determining which one of the adjustments corresponds to the recent pattern of participation.

14. The non-transitory computer readable storage media of claim 13 wherein the rule set specifies shifting the schedule of the events without repeating any of the events when the recent pattern of participation comprises a single instance of incomplete participation adjacent to no other instances of incomplete participation.

15. The non-transitory computer readable storage media of claim 14 wherein the rule set further specifies shifting the schedule of the events and repeating at least one of the events when the recent pattern of participation comprises multiple instances of incomplete participation adjacent to each other.

16. The non-transitory computer readable storage media of claim 15 wherein the program instructions further direct the computing device to display the schedule of events in the graphical user interface to the calendar application, wherein the selection of the checkbox is received through the graphical user interface.

17. The non-transitory computer readable storage media of claim 16 wherein the graphical user interface comprises a control for receiving the user input, wherein the control comprises the checkbox.

18. The non-transitory computer readable storage media of claim 17 wherein the checkbox includes two sub-controls for indicating of whether the given one of the schedule of events was completed or not completed.

19. The non-transitory computer readable storage media of claim 12 wherein the schedule of events comprises a personal fitness schedule of events.

20. The non-transitory computer readable storage media of claim 12 wherein the schedule of events comprises an athletic training schedule of events.

* * * * *